United States Patent
Fong

(10) Patent No.: US 7,683,553 B2
(45) Date of Patent: Mar. 23, 2010

(54) LED CURRENT CONTROL CIRCUITS AND METHODS

(75) Inventor: Vincent Lok-Cheung Fong, Cupertino, CA (US)

(73) Assignee: PacificTech Microelectronics, Inc. (KY)

( * ) Notice: Subject to any disclaimer, the term of this patent is extended or adjusted under 35 U.S.C. 154(b) by 36 days.

(21) Appl. No.: 11/799,173

(22) Filed: May 1, 2007

(65) Prior Publication Data

US 2008/0272651 A1    Nov. 6, 2008

(51) Int. Cl.
  *H05B 41/00* (2006.01)
(52) U.S. Cl. .................. 315/185 R; 345/82; 345/83; 315/297
(58) Field of Classification Search .............. 361/13, 361/57, 45, 6, 198, 28, 102, 196, 1, 79, 181, 361/101, 55, 106, 75, 89, 111, 87, 187, 205, 361/72, 91.5, 91.6, 315; 315/175, 240–242, 315/241 R, 200 R, 170, 239, 209 CD, 209 R
  See application file for complete search history.

(56) References Cited

U.S. PATENT DOCUMENTS

| 5,144,117 | A  | * | 9/1992 | Hasegawa et al. | 235/455 |
| 7,122,971 | B2 | * | 10/2006 | Yeh et al. | 315/185 R |
| 2005/0093792 | A1 | * | 5/2005 | Yamamoto et al. | 345/83 |
| 2007/0013620 | A1 | * | 1/2007 | Tanahashi et al. | 345/82 |

* cited by examiner

*Primary Examiner*—Douglas W Owens
*Assistant Examiner*—Jae K Kim
(74) *Attorney, Agent, or Firm*—Fountainhead Law Group PC

(57) ABSTRACT

Embodiments of the present invention include circuits and methods for electrical current control. In one embodiment, a regulator provides power to the anode end of a set of LED strings. A current setting circuit derives its current from a current reference and generates multiple matching currents that drive the low side (cathode end) of the set of LED strings. The current setting circuit also contains a feedback signal to the regulator that helps maintain a desired voltage level to the anode end of the LED strings. This embodiment is designed to be expandable and drive any number of LED strings. The present invention may be implemented with a high or low side driver scheme to drive the current. Also, the present invention may be implemented with bipolar, nmos, pmos, or any device that operates as a transistor.

14 Claims, 3 Drawing Sheets

LED CURRENT CONTROL CIRCUITS AND METHODS

BACKGROUND

The present invention relates to electrical current control, and in particular, to light emitting diode ("LED") control circuits and methods.

Light emitting diodes ("LEDs") are electronic devices that emit light when a current is passed through the device. Improvements in light emitting diodes (LEDs) have allowed such devices to be used in a growing number of applications requiring a reliable low power light source. In many applications an array of LEDs are used to provide lighting. Liquid Crystal Display ("LCD") backlight applications are one example where several strings of LEDs are driven simultaneously in parallel.

One problem associated with driving several diodes or several strings of diodes in parallel is in keeping all the LEDs at the same brightness. The LED's brightness is related to the magnitude of the current through the LED. Because they are connected in series, each LED within a string of LEDs has the same current flowing through it as all of the other LEDs in the string. However, one problem associated with LED arrays is maintaining a matched current between strings of LEDs which are connected in parallel. For example, different LEDs in an array can have varying "turn on" voltages due to normal manufacturing variances. Accordingly, if the same voltage supply is coupled across the anode and cathode terminals of an LED array, varying levels of current through each LED string will be produced. Variations in the current will, in turn, cause varying levels of brightness for each LED string.

The preset integrated circuit (IC) solution to this problem requires that each LED string couples to a pin on the IC. This type of a solution limits the number of strings that can be implemented by any single IC to the number of input pins provided by the IC. This solution requires more and more ICs as the requirement for higher number of LED strings increases. This can make many potential applications expensive and complicated.

Thus, there is a need for improved electrical current control. The present invention solves these and other problems by providing LED control circuits and methods.

SUMMARY

In one embodiment, the present invention includes a method of controlling currents in a plurality of loads comprising generating a first current in a first load in said plurality of loads, generating an output current based on the first current, and generating a load current in each of said loads using the output current.

In one embodiment, the plurality of loads each comprise a plurality of series connected light emitting diodes.

In one embodiment, the method further comprises generating a reference current, wherein the reference current is used to generate the first current.

In one embodiment, the output current is mirrored to generate each load current.

In one embodiment, the loads comprise light emitting diodes, and the first current is received on a first pin of an integrated circuit.

In one embodiment, the output current is output on a second pin of said integrated circuit.

In one embodiment, the method further comprises generating a regulated voltage on a third pin of said integrated circuit, the regulated voltage is coupled to a first terminal of each of said plurality of loads, the output current is coupled through said second pin of said integrated circuit to a plurality of gates of a plurality of transistors, and each transistor comprises a drain terminal coupled to a different load.

In another embodiment, the present invention includes an integrated circuit comprising a voltage regulator having an input terminal coupled to receive a first voltage, an output terminal coupled to a plurality of first terminals of a plurality of series connected light emitting diodes, and a feedback terminal, a current setting circuit having a first terminal coupled to a second terminal of one of said plurality of series connected light emitting diodes to generate a first current, and a current generating circuit having a first terminal coupled to the current generating circuit and a first output terminal, the current generating circuit generating an output current based on the first current, the first output current is used to generate a plurality of load currents in each of said plurality of series connected light emitting diodes.

In one embodiment, the current setting circuit generates the first current using a reference current.

In one embodiment, the reference current is set using an external resistor.

In one embodiment, the output terminal of the voltage regulator is coupled to a first pin of said integrated circuit, the first terminal of the current setting circuit is coupled to a second pin of an integrated circuit, and the first output terminal of the current generating circuit is coupled to a third pin of said integrated circuit.

In one embodiment, the integrated circuit further comprises a plurality of transistors each having a gate coupled to the first output terminal of said current generating circuit. Each transistor comprises a drain, and the drains of the plurality of transistors are coupled to different second terminals of said plurality of series connected light emitting diodes, and each transistor comprises a source coupled to ground.

In one embodiment, the first current in said current setting circuit and the first output current in said current generating circuit are the same value. In one embodiment, the first current in said current setting circuit is smaller than the first output current in said current generating circuit.

Additional embodiments will be evident from the following detailed description and accompanying drawings, which provide a better understanding of the nature and advantages of the present invention.

DETAILED DESCRIPTION

Described herein are techniques for light emitting diode current control circuits and methods. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include obvious modifications and equivalents of the features and concepts described herein.

Figure 1:
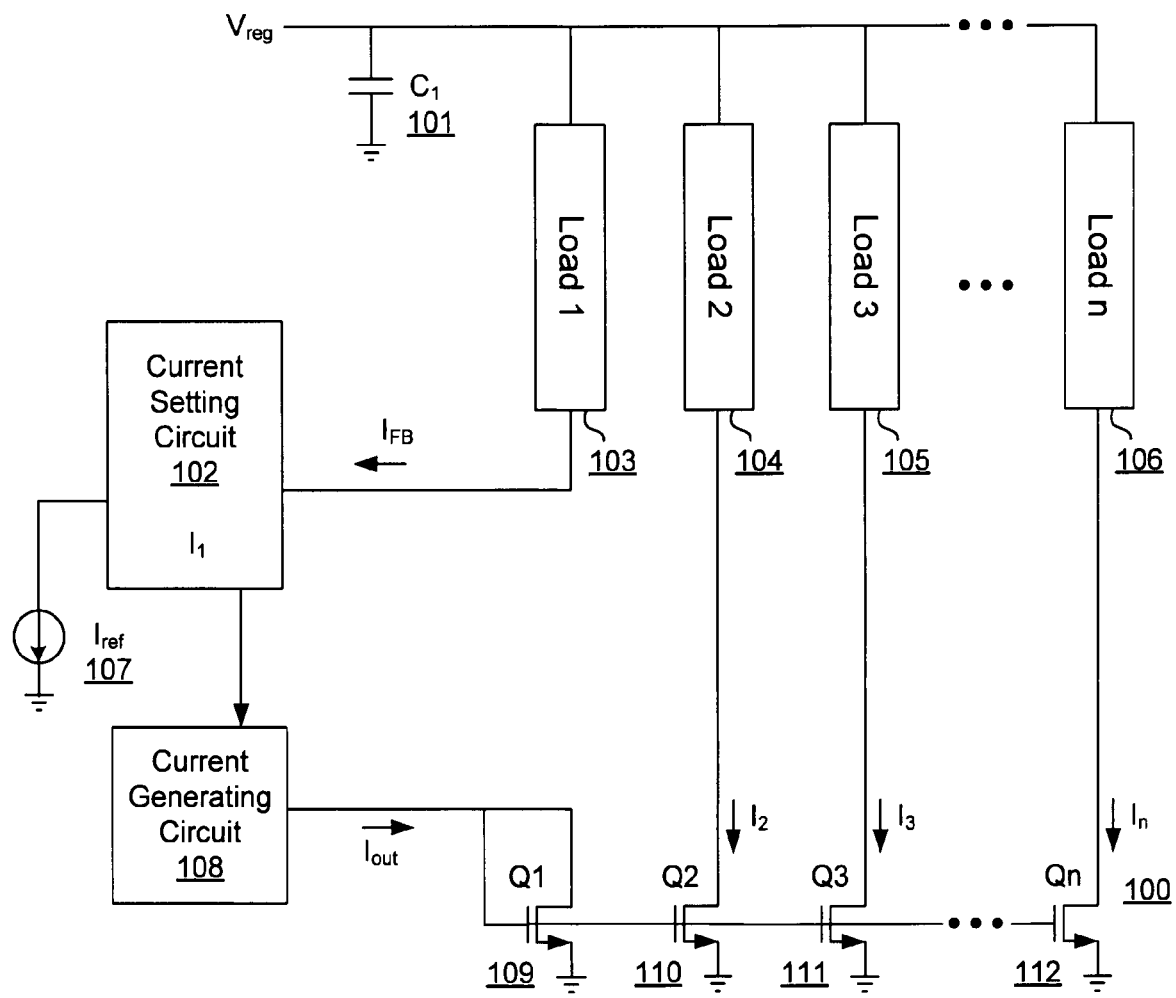
FIG. 1 illustrates a current control circuit according to one embodiment of the present invention.

FIG. 1 illustrates a current control circuit according to one embodiment of the present invention. Circuit 100 provides electrical current control by setting matching drive currents through loads 103-106. A regulated voltage, $V_{reg}$, is provided to one terminal of capacitor 101 and to one terminal of each load (103-106) and provides a source of current for the loads. The other terminal of capacitor 101 is coupled to ground and provides some AC bypass for the regulated voltage $V_{reg}$. The other terminal of load 103 is coupled to a current setting circuit 102, and provides a feedback path to the current setting circuit 102. The other terminal of load 104 is coupled to the drain terminal of transistor 110 which provides current drive for load 104. The other terminal of load 105 is coupled to the drain terminal of transistor 111 which provides current drive for load 105. The other terminal of load 106 is coupled to the drain terminal of transistor 112 which provides current drive for load 106. The drain and gate of transistor 109 and the gates of transistors 110-112 are coupled together and the source terminals of transistors 109-112 are coupled to ground. Transistors 109-112 form a current mirror so that a current entering the gate terminal of transistor 109 raises to a voltage level which will allow the output current $I_{out}$ to flow through the channel of transistor 109, and since all the gates in the drive transistor set are coupled together, all of the drive transistors will be biased to drive a matching current through each of their respective channels.

$$I_{out}=I_2=I_3=I_4=\ldots=I_n.$$

The drive transistors can be bipolar, PMOS, NMOS transistors, or any other device that operates as a transistor. Circuit 100 is designed to be expanded to include any arbitrary number of loads up to "Load n".

Setting the matching drive currents in each load is accomplished by generating a controlled output current $I_{out}$, and feeding that output current into the current mirror of drive transistors (109-112). A current reference $I_{ref}$ 107 is coupled to the current setting circuit 102. A first current $I_{FB}$ through a first load 103 is established by the current setting circuit 102 wherein the value of the first current $I_{FB}$ set using the current reference 107. The first current $I_{FB}$ may be based on a reference current according to the following equation:

$$I_{FB}=mI_{ref},$$

where "m" is a multiplier (e.g., m=1). The current $I_{FB}$ in load 103 may also be referred to as the feedback current or reference load current. For example, the current setting circuit 102 may provide low side drive for load 103 in order to generate the feedback current $I_{FB}$. The current $I_{FB}$ through load 103 may, in turn, be used to set an output current $I_{out}$ to control the currents in the other loads 104-106. For example, current setting circuit 102 may send a signal 190 to current generating circuit 108. Signal 190 may indicate the value of feedback current $I_{FB}$. Current generating circuit 108 may use this signal to generate output current $I_{out}$. The output current, in turn, drives a current mirror to provide a balanced output current to each load 104-106. In this embodiment, the feedback current is sinking a current associated with $I_{FB}$ according to the following equation:

$$I_{FB}=-nI_{out},$$

where n is a multiplier (e.g., n=1) illustrating that the feedback current and the output current may be different related values. The output current feeds into the current mirror of drive transistors (109-112). The drive transistors may be matched by fabricating an array of transistors on a single piece of semiconductor material with matching geometries, for example. In one embodiment, the current setting circuit 102 and current generating circuit 108 may be on a single integrated circuit, and the feedback current $I_{FB}$ is received on one integrated circuit pin and current $I_{out}$ is generated on another integrated circuit pin. Accordingly, a single integrated circuit may be used with an array of transistors to control an array of LEDs.

Figure 2:
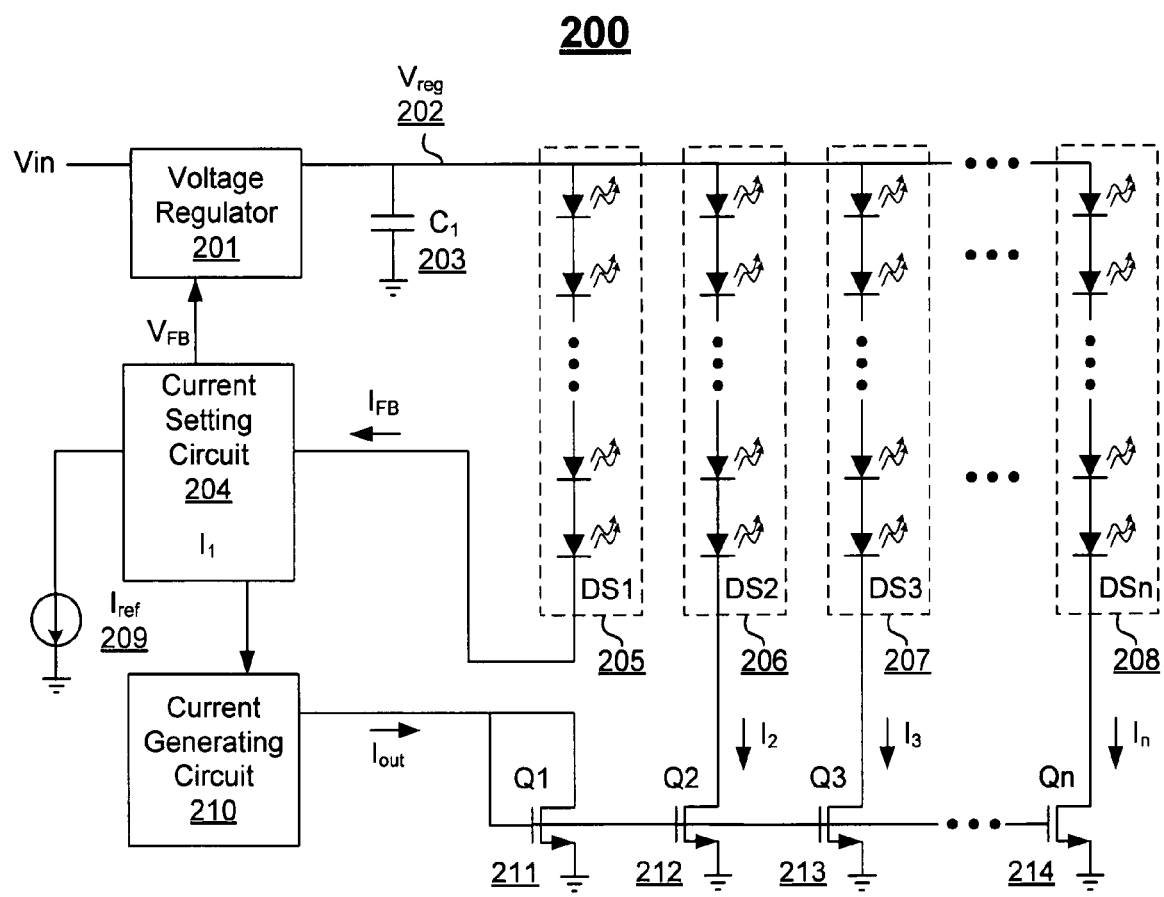
FIG. 2 illustrates a LED current control circuit according to another embodiment of the present invention.

FIG. 2 illustrates an LED current control circuit according to another embodiment of the present invention. Current control circuit 200 includes a voltage regulator 201, capacitor 203, a current setting circuit 204, an LED array comprising a plurality of LED loads DS1 205, DS2 206, DS3 207, and DSn 208 each comprising a plurality of series connected LEDs. Each LED load includes a plurality of LEDs coupled in series to form an LED string. The circuit further comprises a current reference 209, a current generating circuit 210, and a set of drive transistors 211-214. Circuit 200 is designed to be expanded to include any arbitrary number of strings up to "DSn".

In FIG. 2, a DC input voltage Vin is presented to the input terminal of voltage regulator 201. The feedback terminal of regulator 201 is coupled to the current setting circuit 204. Current setting circuit 204 provides a signal (FB) to regulator 201, which conveys information regarding the level of $V_{reg}$ (202). The output terminal of regulator 201 provides a reference voltage $V_{reg}$ (202). The output terminal of regulator 201 is coupled to one terminal of capacitor 203 and to one terminal of each LED string in a set of LED strings 205-208. The other terminal of capacitor 203 is coupled to ground. The other terminal of LED string 205 is coupled to the current setting circuit 204. The other terminal of load 206 is coupled to the drain terminal of transistor 212. The other terminal of load 207 is coupled to the drain terminal of transistor 213. In fact, any LED string in a set of LED strings may have the anode terminal coupled to $V_{reg}$ and the cathode terminal coupled to the drain of a drive transistor. Likewise, the last load 208; denoted by "DSn", may have the anode terminal coupled to $V_{reg}$ and the cathode terminal coupled to the drain terminal of transistor 214 denoted "Qn".

The reference current 209 is coupled to the current setting circuit 204. Current setting circuit 204 provides a signal to current generating circuit 210 indicating the current to be set. The current setting circuit 204 also couples one terminal to ground. 204 is also coupled to the feedback terminal of voltage regulator 201. The current generating circuit 210 has a terminal coupled to ground. Circuit 210 provides a current $I_{out}$ to the drain terminal of transistor 211, the gate terminal of transistor 211, the gate terminal of transistor 212, the gate terminal of transistor 213, and the gate terminal of transistor 214. The source terminals of driver transistors 211-214 are all coupled to ground. Any number of drive transistors in a set of drive transistors may have its gate terminal coupled to the $I_{out}$ terminal of current generating circuit 210 for controlling the current in a corresponding load and a source terminal coupled to ground. The drive transistors can be bipolar, PMOS, NMOS transistors, or any other device that operates as a transistor.

Circuit 200 provides current control by regulating a voltage to the anode side of the LED strings and providing matching drive currents on the low side (cathode side) of the LED strings. Input voltage $V_{in}$ is provided to regulator 201. Regulator 201 may be a linear or switching regulator. For example, voltage $V_{in}$ may be a voltage lower than $V_{out}$ for switching boost regulators, or voltage $V_{in}$ could be a voltage higher than $V_{out}$ for switching buck regulators and linear regulators. Regulator 201 provides a regulated voltage sufficient to drive the number of LEDs in any single LED string, and provide enough power to drive all the current requirements of all the LED strings. In one example embodiment, the reference current $I_{ref}$ may be compared to the current $I_1$ in the reference LED load (or voltages relating to the currents may be compared), and the result may be used as the feedback to the regulator to control the voltage provided to the LED array. For example, if the current in the reference LED load 205 is too low, the voltage at the output of the regulator 201 may be increased, thereby increasing the current through the reference load. Alternatively, if the current in the reference LED load 205 is too high, the voltage at the output of the regulator 201 may be decreased, thereby decreasing the current through the reference load.

Setting the drive currents in each load is accomplished by deriving current in each load from a current $I_1$ that is used to drive LED string 205. The current $I_1$ may be based on a reference current $I_{ref}$ according to the following equation:

$$I_1 = mI_{ref}$$

where "m" is a multiplier (e.g., m=1). A control signal developed from current setting circuit 204 is coupled to current generating circuit 210. The control signal may be used to set the current generated by circuit 210. Current generating circuit 210 generates a current $I_{out}$ that matches $I_1$ in the reference load 205.

$$I_1 = I_{out}$$

The current $I_{out}$ feeds into an array of matched drive transistors set up to work as a current mirror. The gate terminal of transistor 211 raises to the level which will allow the current $I_{out}$ to flow through the channel of transistor 211, and since all the gates in the drive transistor set are coupled together, all of the drive transistors will be biased to drive a matching current through each of their respective channels.

$$I_1 = I_{out} = I_2 = I_3 = \ldots = I_n$$

In other words, the circuit 300 provides electrical current control by setting matching currents to all LED strings derived from a current set in a reference LED string. With matching currents all LEDs will have correspondingly matching brightness levels. In one embodiment, the current setting circuit 204, current generating circuit 210, and the regulator may be on a single integrated circuit, and the current $I_1$ is received on one integrated circuit pin and current $I_{out}$ is generated on another integrated circuit pin. Accordingly, a single integrated circuit may be used with an array of transistors to control an array of LEDs.

Figure 3:
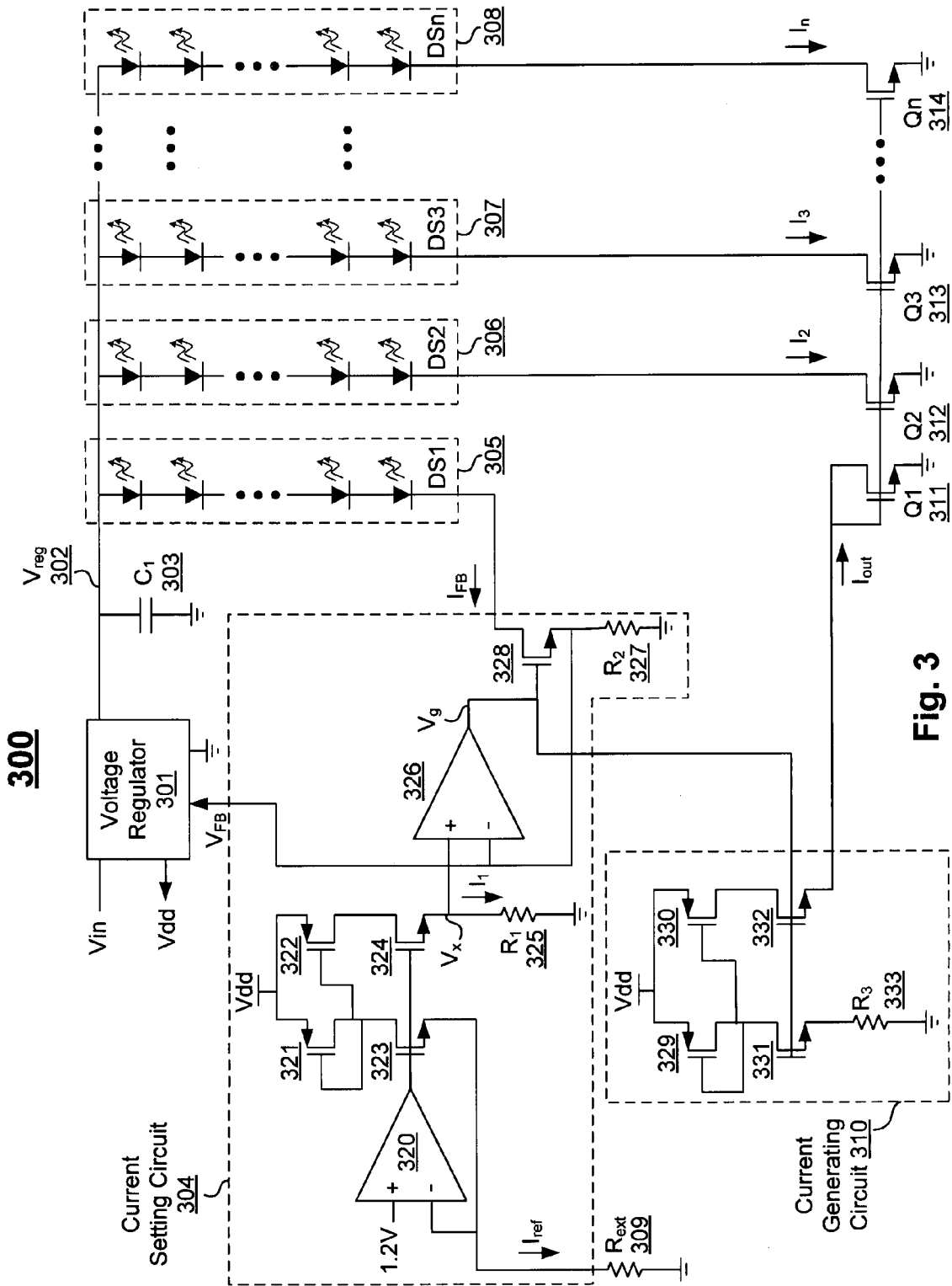
FIG. 3 illustrates a LED current control circuit according to another embodiment of the present invention.

FIG. 3 illustrates an LED current control circuit according to another embodiment of the present invention. Current control circuit 300 includes a voltage regulator 301, capacitor 303, a current setting circuit 304, an LED array comprising a set of LED loads DS1 305, DS2 306, DS3 307, and DSn 308. Each LED load includes a plurality of LEDs coupled in series to form an LED string. The circuit further comprises a resistor 309, a current generating circuit 310, and a set of drive transistors 311-314. The current setting circuit 304 includes a 1.2V voltage reference, operational amplifiers 320 and 326, resistors 325 and 327, and transistors 321, 322, 323, 324, and 328. Current generating circuit 310 includes resistor 333 and transistors 329-332. Circuit 300 is designed to be expanded to any arbitrary number of LED strings up to "DSn".

In FIG. 3, a DC voltage, Vin, is presented to the input terminal of voltage regulator 301. The feedback terminal is coupled to the current setting circuit 304. Current setting circuit 304 provides a signal (FB) to regulator 301 which conveys information regarding the regulator output voltage level $V_{reg}$ (302). One output terminal of regulator 301 provides a internal voltage reference Vdd which is coupled to current setting circuit 304 and current generating circuit 310. The output terminal 302 of voltage regulator 301 provides a reference voltage $V_{reg}$. The output terminal of regulator 301 is coupled to one terminal of capacitor 303, and to the anode terminals of each LED string in a set of LED strings 305-308. The other terminal of capacitor 303 is coupled to ground. The cathode terminals of LED string 305 is coupled to the drain terminal of transistor 328. The other terminal of load 306 is coupled to the drain terminal of transistor 312. The other terminal of load 307 is coupled to the drain terminal of transistor 313. In fact, any LED string in a set of LED strings would have the anode terminal coupled to $V_{reg}$ and the cathode terminal coupled to the drain of a drive transistor. Likewise, the last load 308, denoted by "DSn", may have the anode terminal coupled to $V_{reg}$ and the cathode terminal coupled to the drain terminal of transistor 314 denoted "Qn".

A reference resistor 309, which may be external to an IC for example, is coupled to current setting circuit 304 via the inverting terminal of amplifier 320. The inverting terminal is also coupled to the source terminal of transistor 323. The non-inverting terminal of amplifier 320 is coupled to the 1.2V voltage reference. The output terminal of amplifier 320 is coupled to the gate terminal of transistor 323 and the gate terminal of transistor 324. The drain of transistor 323 is coupled to the drain terminal of transistor 321, the gate terminal of transistor 321, and the gate terminal of transistor 322. The source terminal of transistor 321 is coupled to internal voltage reference Vdd. The source terminal of transistor 322 is also coupled to Vdd. The drain terminal of transistor 322 is coupled to the drain terminal of transistor 324. The source terminal of transistor 324 is coupled to one terminal of resistor 325 and the non-inverting terminal of amplifier 326. The other terminal of resistor 325 is coupled to ground. The inverting terminal of amplifier 326 is coupled to the feedback terminal of voltage regulator 301, to the source terminal of transistor 328, and one terminal of resistor 327. The other terminal of resistor 327 is coupled to ground. The output terminal of amplifier 326 is coupled to the gate terminal of transistor 328, the gate terminal of transistor 331, and the gate terminal of transistor 332. Transistors 331 and 332 are part of current generating circuit 310.

In the current generating circuit 310, source terminal of transistor 331 is coupled to one terminal of resistor 333. The other terminal of resistor 333 is coupled to ground. The drain terminal of transistor 331 is coupled to the drain terminal of transistor 329, the gate terminal of transistor 329, and the gate terminal of transistor 330. The source terminal of transistor 329 is coupled to Vdd. The source terminal of transistor 330 is coupled to Vdd. The drain terminal of transistor 330 is coupled to the drain of transistor 332. The source terminal of transistor 332 is coupled to the drain terminal of transistor 311, the gate terminal of transistor 311, the gate terminal of transistor 312, the gate terminal of transistor 313, and the gate terminal of transistor 314. In fact, any drive transistor in the set of drive transistors would have its gate terminal coupled to the source terminal of transistor 332. The source terminals of driver transistors 311-314 are all coupled to ground. In fact, any transistor in the set of drive transistors would have its source terminal coupled to ground. The drive transistors can be bipolar, PMOS, NMOS transistors, or any other device that operates as a transistor.

Circuit 300 provides electrical current control by regulating a voltage to the anode side of the LED strings and providing matching drive currents on the low side (cathode side) of the LED strings. $V_{in}$ is provided to regulator 301. $V_{in}$ could be a voltage higher than $V_{reg}$ for switching boost regulators or could be a voltage lower than $V_{reg}$ for switching buck regulators and linear regulators. Regulator 301 provides a regulated voltage sufficient to drive the number of LEDs in any single LED string, and provide enough power to drive all the current requirements of all the LED strings. In one example embodiment, setting the drive currents is accomplished by developing a current $I_1$ which is used to drive LED string 305. The 1.2V reference, amplifier 320, and transistors 321-324 set up a current ($I_{ref}$) through resistor 309 as follows:

$$I_{ref}=1.2v/R_{ext}.$$

Transistors 321-324 form a current mirror so that $I_{ref}=I_x$. $I_x$ forms a voltage $V_x$ across resistor 325 ($R_1$):

$$V_x=I_xR_1.$$

$V_x$, amplifier 326, transistor 328, resistor 327 ($R_2$), the regulated voltage on terminal 302 ($V_{reg}$), and LED string DS1 305 set up a current $I_1$.

$$I_1 = \frac{V_x}{R_2}$$
$$V_x = I_x R_1$$
$$I_{ref} = I_x$$
$$I_{ref} = 1.2v/R_{ext}$$
$$I_1 = \frac{V_x}{R_2} = \frac{1.2V * R_1}{R_{ext} * R_2}$$

Substituting the relationships into the equation for $I_1$ results in $I_1=mI_{ref}$ where $m=R_1/R_2$ and "m" is a multiplier (e.g., m=1). If $R_1=R_2$, then m=1. Accordingly, it can be seen that the feedback current I1 can be used to generated a voltage $V_x$ related to the regulator output 302 ($V_{reg}$), which in this example may be used to provide feedback for regulator 301.

The current through the channel of transistor 328 is controlled by the output of amplifier 326 denoted "$V_g$." The current generating circuit 310 is biased by signal $V_g$. Specifically, transistors 331 and 332 are biased by signal $V_g$. Transistors 329-332 form a current mirror. If $R_3=R_2=R_1$, then $I_1=I_{out}$. The array of matched drive transistors (depicted by 311-314) are set up to work as a current mirror with an input current, $I_{out}$. The gate terminal of transistor 311 raises to the level which will allow the current $I_{out}$ to flow through the channel of transistor 311, and since all the gates in the drive transistor set are coupled together, all of the drive transistors will be biased to drive a matching current through each of their respective channels. $I_1=I_{out}=I_2=I_3=\ldots=I_n$. In this way all the LED strings in the set will experience matching currents and correspondingly have matching brightness levels.

In other words, the circuit 300 provides electrical current control by providing a reference voltage and setting matching currents to all LED strings derived from a current set in a reference LED string. With matching currents all LEDs will have correspondingly matching brightness levels. In one embodiment, the current setting circuit 304, current generating circuit 310, and the regulator may be on a single integrated circuit, and the current $I_1$ is received on one integrated circuit pin and current $I_{out}$ is generated on another integrated circuit pin. Accordingly, a single integrated circuit may be used with an array of transistors to control an array of LEDs.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, electrical current control methods according to the present invention may include some or all of the innovative features described above. Based on the above disclosure and the following claims, other arrangements, embodiments, implementations and equivalents will be evident to those skilled in the art and may be employed without departing from the spirit and scope of the invention as defined by the claims.

What is claimed is:

1. A method of controlling currents in a plurality of loads comprising:
   receiving a first input voltage on a first pin of an integrated circuit;
   generating a first regulated voltage on a second pin of the integrated circuit based on the first input voltage, wherein the regulated voltage is coupled to a first terminal of a first load and a plurality of first terminals of a plurality of second loads, wherein the first load has a second terminal coupled to a third pin of the integrated circuit, and wherein a first feedback current is generated in the first load;
   receiving the first feedback current on the third pin of the integrated circuit;
   generating an output current on a fourth pin of the integrated circuit based on the first feedback current, wherein the output current on the fourth pin is coupled to gate terminals of a plurality of transistors, and wherein drain terminals of the plurality of transistors are coupled to second terminals of said second loads; and
   generating a load current in each of said plurality of second loads, but not the first load, using the output current.

2. The method of claim 1 wherein the first load and the plurality of second loads each comprise a plurality of series connected light emitting diodes.

3. The method of claim 1 further comprising generating a reference current, wherein the reference current is used to generate the first current.

4. The method of claim 1 wherein the output current is mirrored to generate each load current.

5. The method of claim 1 wherein the output current is coupled to said gate terminals of the plurality of transistors through a first transistor having a gate terminal and drain terminal coupled to the fourth pin of the integrated circuit.

6. The method of claim 5 wherein source terminals of the plurality of transistors and said first transistor are coupled to ground.

7. An integrated circuit comprising:
   a voltage regulator having an input terminal coupled to receive a first voltage, an output terminal coupled to a plurality of first terminals of a plurality of series connected light emitting diodes, and a feedback terminal;
   a current setting circuit having a first terminal coupled to a second terminal of a first series connected light emitting diodes of said plurality of series connected light emitting diodes to generate a first feedback current in the first series connected light emitting diodes; and
   a current generating circuit having a first terminal coupled to the current setting circuit and a first output terminal coupled to a plurality of second terminals of said plurality of series connected light emitting diodes excluding the second terminal of the first series connected light emitting diodes, the current generating circuit generating an output current based on the first feedback current, wherein the output current is used to generate a plurality of load currents in each of said plurality of series connected light emitting diodes excluding the first series connected light emitting diodes.

8. The integrated circuit of claim 7 wherein the current setting circuit generates the first current using a reference current.

9. The integrated circuit of claim 8 wherein the reference current is set using an external resistor.

10. The integrated circuit of claim 7 wherein the output terminal of the voltage regulator is coupled to a first pin of said integrated circuit, the first terminal of the current setting circuit is coupled to a second pin of said integrated circuit, and the first output terminal of the current generating circuit is coupled to a third pin of said integrated circuit.

11. The integrated circuit of claim 10, wherein the third pin is coupled to a plurality of transistors each having a gate coupled to the first output terminal of said current generating circuit, wherein each transistor comprises a drain, and wherein the drains of the plurality of transistors are coupled to different second terminals of said plurality of series connected light emitting diodes excluding the first series connected light emitting diodes, and wherein each transistor comprises a source coupled to ground.

12. The integrated circuit of claim 7 wherein the first current in said current setting circuit and the first output current in said current generating circuit are the same value.

13. The integrated circuit of claim 7 wherein the first current in said current setting circuit is smaller than the first output current in said current generating circuit.

14. The integrated circuit of claim 11 wherein the third pin is coupled to a drain and a gate a first transistor, and wherein the source of the first transistor is coupled to ground.

* * * * *